March 17, 1953 — C. R. PATON — 2,631,844
TORSION BAR MOUNTING

Original Filed Jan. 21, 1946 — 2 SHEETS—SHEET 1

CLYDE R. PATON
INVENTOR.

BY

ATTORNEYS.

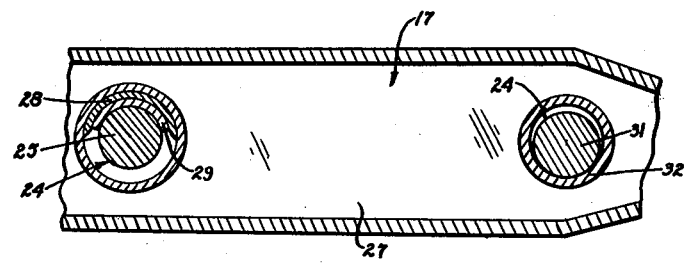
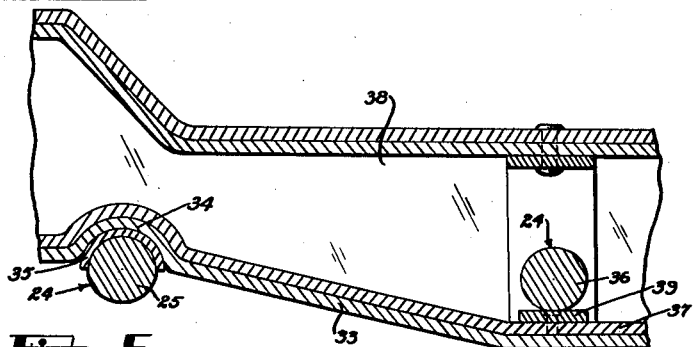
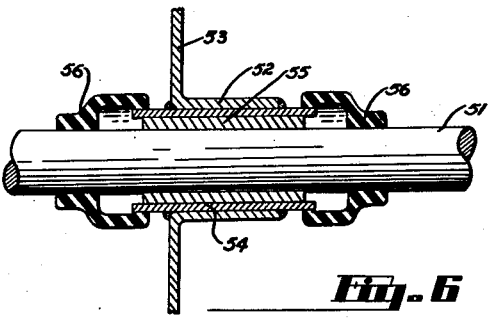
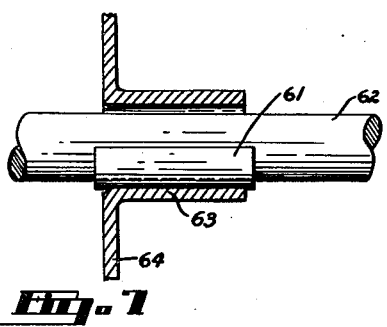

Patented Mar. 17, 1953  2,631,844

UNITED STATES PATENT OFFICE 2,631,844

TORSION BAR MOUNTING

Clyde R. Paton, Bloomfield Village, Mich., assignor to Ford Motor Company, Dearborn, Mich., a corporation of Delaware Continuation of abandoned application Serial No. 642,509, January 21, 1946. This application June 16, 1951, Serial No. 232,038

12 Claims. (Cl. 267—57)

This invention relates generally to torsion bar suspensions for motor vehicles, and is a continuation of applicant's copending application, Serial Number 642,509, filed January 21, 1946, now abandoned.

Applicant's construction is applicable to a vehicle suspension system of the type employing a pair of vertically spaced levers extending transversely from each side of the front portion of the vehicle frame. The levers are pivotally connected at their inner ends to the frame and at their outer ends to wheel carriers supporting the front road wheels. Each front wheel is resiliently suspended by means of a torsion bar extending longitudinally of the vehicle between one of the levers and the frame and spaced laterally from the pivotal axis of the lever. The forward end of each torsion bar is U-shaped and is arranged in supporting relation with the lever at a pair of transversely spaced points. The rearward end of the torsion bar is similarly U-shaped and has spaced points of support with a transverse frame member. Relative angular movement occurs at one of the points of support between the torsion bar and the lever, and between the torsion bar and the frame, as the front wheel encounters road irregularites and the torsion bar is stressed. Antifriction bearings of semi-cylindrical shape are used at these points to reduce wear and eliminate noise, and yet enable the torsion bar to be easily assembled and disassembled from the vehicle.

Other objects and advantages of the invention will be made more apparent as this description proceeds, particularly when considered in connection with the accompanying drawings, in which.

Figure 1:
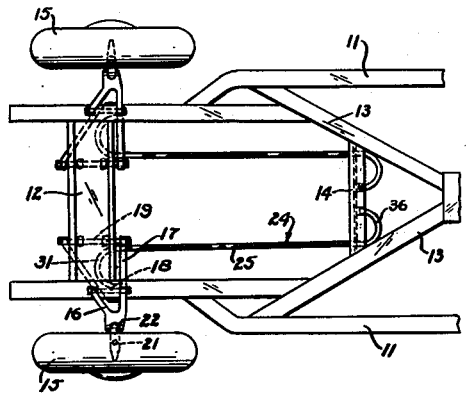
Figure 1 is a plan view of the front portion of a motor vehicle chassis equipped with torsion bars mounted in accordance with the present invention.
Figure 2:
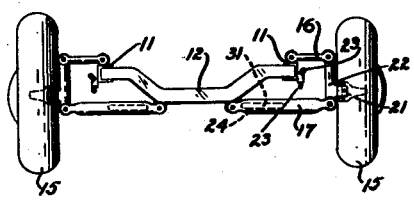
Figure 2 is a front end elevation of the construction shown in Figure 1.
Figure 3:
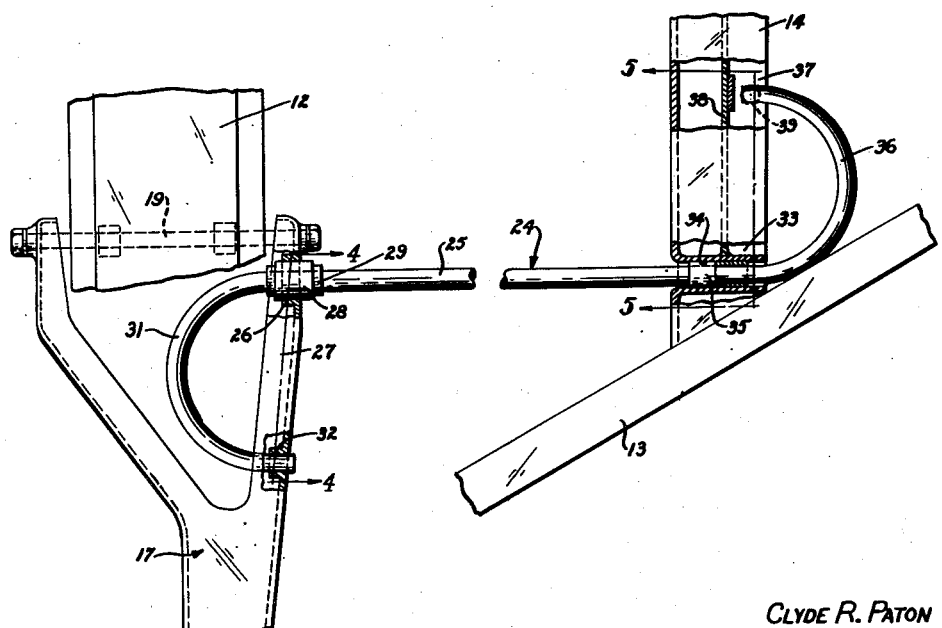
Figure 3 is an enlarged fragmentary plan view of a portion of Figure 1.

Figures 4 and 5 are enlarged cross-sectional views taken substantially on the lines 4—4 and 5—5 of Figure 3.

Figure 6 is a longitudinal cross-sectional view through a modified mounting.

Figure 7 is a longitudinal cross-sectional view through another modification.

Referring now more particularly to the drawings, the reference character 11 indicates the side members of a vehicle frame having a front cross member 12, X-frame members 13, and a transverse frame member 14 supported between the X-frame member. Front wheels 15 are independently mounted upon the frame by suspensions of the double lever type. The suspension for each front wheel being identical, only that for the left front wheel will be described in detail.

A pair of vertically spaced upper and lower "wishbone" levers 16 and 17 are pivotally mounted upon the vehicle frame upon shafts 18 and 19 respectively. Wheel 15 is connected by a king pin 21 to a wheel carrier 22, the upper and lower portions of which are pivotally connected to the outer ends of the levers 16 and 17 respectively. Pivotal movement of the levers is limited by a pair of resilient stops 23 mounted upon the frame.

A torsion bar 24, having a straight body portion 25, extends generally longitudinally of the vehicle frame, being spaced laterally outwardly a short distance from a pivotal axis of the lower lever 17. At its forward end, the straight body portion 25 of the torsion bar extends through a hollow sleeve 26 formed in the rearward arm 27 of the lower lever 17. A semi-cylindrical shell 28 is welded or otherwise suitably secured in the upper half of the sleeve 26, extending for approximately one-half the circumference thereof.

Located between the torsion bar and the shell 28 is a bearing 29 of antifriction material. The bearing 29 can be formed of either metallic or nonmetallic antifriction material and can be either of the lubricated or nonlubricated type. The bearing 29 is shown as extending slightly less than one-half the circumference of the torsion bar and may be bonded or otherwise secured to the bar, in which case it frictionally engages the shell 28; or it may be bonded or secured in the shell and frictionally engageable with the torsion bar. The portion of the torsion bar extending forwardly of the sleeve 26 is formed into a curved return-bend or U-shaped portion 31 with the free end thereof received within a sleeve 32 formed in the rearward arm 27 of the lower lever 17 at a point spaced laterally outwardly from the sleeve 26.

With the above-described construction, the torsion bar 24 has a pair of spaced points of support with the lever 17, at the sleeves 26 and 32. It has been found that the U-shaped portion 31 of the torsion bar continues in torsion for approximately 30° beyond its point of initial curvature, and that beyond this point the stress changes from torsion to bending. As a result of this continuation of the torsional stress, relative angular movement occurs between the torsion bar and the lower lever in the region of the sleeve 26, and since there is a considerable load upon the torsion bar, objectionable wear accompanied by squeaks and other noises is likely to result. The antifriction bearing 29 between the torsion bar and the sleeve 26 permits the required relative angular movement without causing objectionable wear or annoying sounds. Inasmuch as the semi-cylindrical shell 28 and bearing 29 extend circumferentially around the upper half only of the torsion bar, clearance is provided between the torsion bar and the lower half of the sleeve 26. This clearance facilitates the assembly and disassembly of the torsion bar and the lever.

The rearward end of the straight body portion 25 of the torsion bar extends beneath the transverse frame member 14. The lower flange 33 of the frame member 14 is formed with a longitudinally extending semi-cylindrical groove 34 which receives a semi-cylindrical bearing 35, positioned between the torsion bar and the frame member. The bearing 35 is formed of a suitable antifriction material and extends around the upper half of the torsion bar. As desired, the bearing 35 can be bonded or suitably secured to either the torsion bar or the lower flange 33 of the frame member.

Rearwardly of the transverse frame member 14, the torsion bar is formed with a curved return-bend or U-shaped portion 36, similar to the forward U-shaped portion 31, but extending in the opposite direction therefrom. The free end of the rear U-shaped portion 36 of the torsion bar rests upon the upper surface of the lower flange 37 of a channel 38 secured within the transverse frame member 14. Shims 39 may be positioned between the free end of the torsion bar and the lower flange 37 of the channel 38 to permit adjustment of the riding height of the vehicle.

Because of the U-shaped construction of the rear end of the torsion bar, the torsional stress in the bar continues beyond the point of support with the frame member 14, causing relative angular movement between the bar and the frame member. The load at this point, however, is taken by the anti-friction bearing 35, and consequently during operation the mounting is noiseless.

A modified form of mounting for a torsion bar is illustrated in Figure 6, in which a torsion bar 51 extends through a sleeve 52 formed integrally with a lever 53 of the wheel suspension. A hollow shell 54 is positioned within the sleeve 52 and can be either pressed therein or arc-tacked to the sleeve. A bearing 55 of antifriction material is located between the shell 54 and the torsion bar, being preferably bonded to the torsion bar after the latter is formed. Oil resistant annular sealing caps 56 of rubber or other resilient material are positioned between the opposite ends of the shell 54 and the torsion bar and form retainers for the lubricant used with the bearing 55. If a bearing material of the nonlubricated type is used, the seals 56 are unnecessary and can be eliminated.

Another modification is shown in Figure 7, in which a semi-cylindrical antifriction bearing 61 is bonded to a torsion bar 62 and is arranged in direct frictional engagement with the interior surface of a sleeve 63 extending outwardly from the suspension lever 64, thus forming a simplified construction.

Although various types of antifriction bearing materials can be used, one advantageous type is a compacted, internally-lubricated bearing composed basically of powdered metal. Other types can be used, however, such as lubricated bearings and bearings of non-metallic material such as brake lining.

It will be understood that the invention is not to be limited to the exact construction shown and described, but that various changes and modifications may be made without departing from the spirit and scope of the invention, as defined in the appended claims.

What is claimed is:

1. A vehicle suspension comprising a frame having an intermediate cross member, a pair of vertically spaced levers extending transversely of said frame and pivotally connected at their inner ends to said frame, a wheel carrier pivotally connected to the outer ends of said levers, a road wheel supported by said wheel carrier, a torsion bar extending longitudinally of said frame between one of said levers and said cross member, said last-mentioned lever having a sleeve through which said torsion bar extends, an antifriction bearing positioned between said torsion bar and said sleeve to provide for relative angular movement between said bar and sleeve, said torsion bar extending beyond said sleeve and having a curved end portion arranged in supporting relation with said last-mentioned lever at a point spaced transversely from said sleeve, and means anchoring the opposite end of said torsion bar to said cross member.

2. A vehicle suspension comprising a frame having an intermediate cross member, a pair of vertically spaced levers extending transversely of said frame and pivotally connected at their inner ends to said frame, a wheel carrier pivotally connected to the outer ends of said levers, a road wheel supported by said wheel carrier, a torsion bar extending longitudinally of said frame between one of said levers and said cross members, said cross member having a semi-cylindrical groove formed in its lower surface, said torsion bar extending beneath said cross member and relatively angularly movable with respect thereto, and a semi-cylindrical antifriction bearing positioned between the semi-cylindrical groove and the upper portion of said torsion bar, and means anchoring the opposite end of said torsion bar to said last-named lever.

3. A vehicle suspension comprising a frame having an intermediate cross member, a pair of vertically spaced levers extending transversely of said frame and pivotally connected at their inner ends to said frame, a wheel carrier pivotally connected to the outer ends of said levers, a road wheel supported by said wheel carrier, a torsion bar extending longitudinally of said frame between one of said levers and said cross member, one of said levers having a pair of sleeves integrally formed therein at transversely spaced points, said torsion bar extending through one of said sleeves and angularly movable with respect thereto, a semi-cylindrical antifriction bearing positioned between said last-mentioned sleeve and the upper portion of said torsion bar, the portion of said torsion bar beyond said last-mentioned sleeve being substantially U-shaped and terminating in a free end received within the other of said sleeves, the opposite end of said torsion bar extending beneath said cross member and being positioned within a semi-cylindrical groove formed on the lower side of said member, and a semi-cylindrical antifriction bearing positioned between said cross member and the upper portion of said torsion bar to provide for relative angular movement between said member and bar, the portion of said torsion bar beyond said last-mentioned bearing being substantially U-shaped and terminating in a free end supported upon the upper side of the lower flange of said cross member.

4. The structure defined by claim 3 which is further characterized in that means are provided for adjusting the last-mentioned free end of said torsion bar with respect to the lower flange of said cross member.

5. A vehicle suspension comprising a frame having an intermediate cross member, a suspension member pivotally connected to said frame and supporting the road wheel, a torsion bar extending between said members, one of said members having a sleeve through which said torsion bar extends, an antifriction bearing positioned between said torsion bar and said sleeve to provide for relative angular movement between said bar and sleeve, said torsion bar extending beyond said sleeve and having a U-shaped end portion arranged in supporting relation with said last-mentioned member at a point substantially in transverse alignment with said sleeve, and means anchoring the opposite end of said torsion bar to the other of said members.

6. A vehicle suspension comprising a frame having an intermediate cross member, a suspension member pivotally connected to said frame and supporting the road wheel, a torsion bar extending between said members, one of said members having a sleeve through which said torsion bar extends, a semi-cylindrical antifriction bearing positioned between said torsion bar and said sleeve to provide for the relative angular movement between said bar and sleeve, said torsion bar extending beyond said sleeve and leaving a U-shaped end portion arranged in supporting relation with said last-mentioned member at a point substantially in transverse alignment with said sleeve, and means anchoring the opposite end of said torsion bar to the other of said members.

7. A vehicle suspension comprising a frame having an intermediate cross member, a suspension member pivotally connected to said frame and supporting the road wheel, a torsion bar extending between said members, a semi-cylindrical antifriction bearing bonded to said torsion bar and engaging one of said members, said torsion bar extending beyond said antifriction bearing and having a curved end portion anchored to said last-named member at a point spaced from said antifriction bearing, and means anchoring the opposite end of said torsion bar to the other of said members.

8. In a vehicle having a frame and a road wheel, a transversely extending suspension member pivotally connected at its inner end to said frame and at its outer end supporting said road wheel, a torsion bar having a point of support with said frame, the opposite end of said torsion bar being generally U-shaped and having a pair of transversely spaced points of support with said suspension member, said torsion bar intersecting said suspension member at substantially right angles at said points of support.

9. In a vehicle having a frame and a road wheel, a transversely extending suspension member pivotally connected at its inner end to said frame and at its outer end supporting said road wheel, a torsion bar having a point of support with said frame, the opposite end of said torsion bar being generally U-shaped and the opposite sides of said U-shaped end having longitudinally extending zones of engagement, said zones of engagement being substantially in transverse alignment with each other.

10. In a vehicle, the combination of a frame, road wheels on opposite sides of said frame, transversely extending suspension members on opposite sides of said frame, each suspension member having its inner end pivotally connected to said frame and its outer end connected to one of said road wheels, torsion bars for resiliently supporting said wheels upon said frame, each of said torsion bars having one end in supporting relation with said frame and the opposite end formed with a curved return-bend portion bearing against the suspension member for one wheel at two transversely spaced points, the two portions of said bar which bear against the adjacent suspension member being laterally spaced from each other, one coinciding with the axis of the bar and the other extending generally parallel thereto.

11. An independent suspension for a vehicle comprising a frame, a cross member on said frame, a road wheel, a wheel carrier supporting said wheel, a pair of vertically spaced levers pivotally connected at opposite ends to said wheel carrier and to said frame for independently mounting said wheel on said frame, and a torsion bar extending parallel to and spaced from the pivotal axis of the connection between one of said levers and said frame, one end of said torsion bar being U-shaped and engaging said lever along transversely spaced axes, one of said axes coinciding with the axis of said torsion bar and the other extending substantially parallel to the axis of said torsion bar, and the opposite end of said torsion bar also being U-shaped and having two spaced points of support with said cross member.

12. An independent suspension for a vehicle comprising a frame, a cross member on said frame, a road wheel, a wheel carrier supporting said wheel, a pair of vertically spaced levers pivotally connected at opposite ends to said wheel carrier and to said frame for independently mounting said wheel on said frame, and a torsion bar having a straight portion extending parallel to and laterally spaced outwardly from the pivotal axis of the connection between one of said levers and said frame, one end of the straight portion of said torsion bar abutting with said last-mentioned lever at a point spaced outwardly from said pivotal axis and having a curved end portion abutting said last-mentioned lever at a point laterally outwardly from said first-mentioned point of abutment, the opposite end of said torsion bar being U-shaped and abutting said cross member at points on opposite sides of said pivotal axis.

CLYDE R. PATON.

REFERENCES CITED

The following references are of record in the file of this patent:

UNITED STATES PATENTS

| Number | Name | Date |
|---|---|---|
| 1,317,818 | Parker | Oct. 7, 1919 |
| 1,383,466 | Jett | July 5, 1921 |
| 1,708,997 | Avery | Apr. 16, 1929 |
| 2,160,862 | Hickman | June 6, 1939 |
| 2,167,984 | Leighton | Aug. 1, 1939 |
| 2,245,809 | Olley | June 17, 1941 |

FOREIGN PATENTS

| Number | Country | Date |
|---|---|---|
| 555,388 | Great Britain | Aug. 20, 1943 |
| 566,570 | Great Britain | Jan. 4, 1945 |